(12) United States Patent
Li et al.

(10) Patent No.: US 9,841,585 B2
(45) Date of Patent: Dec. 12, 2017

(54) OPTICAL LENS

(71) Applicant: HAN'S LASER TECHNOLOGY INDUSTRY GROUP CO., LTD., Shenzhen, Guangdong (CN)

(72) Inventors: Jiayang Li, Guangdong (CN); Chaoming Zhou, Guangdong (CN); Bo Sun, Guangdong (CN); Yunfeng Gao, Guangdong (CN)

(73) Assignee: Han's Laser Technology Industry Group Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/324,049

(22) PCT Filed: Aug. 28, 2014

(86) PCT No.: PCT/CN2014/085376
§ 371 (c)(1),
(2) Date: Jan. 5, 2017

(87) PCT Pub. No.: WO2016/029396
PCT Pub. Date: Mar. 3, 2016

(65) Prior Publication Data
US 2017/0199359 A1  Jul. 13, 2017

(51) Int. Cl.
*G02B 13/18* (2006.01)
*G02B 3/02* (2006.01)
(Continued)

(52) U.S. Cl.
CPC .......... *G02B 13/18* (2013.01); *B23K 26/0617* (2013.01); *B23K 26/0648* (2013.01);
(Continued)

(58) Field of Classification Search
CPC .... G02B 13/0035; G02B 13/004; G02B 9/12; G02B 9/34; G02B 13/04
(Continued)

(56) References Cited

U.S. PATENT DOCUMENTS 4,240,701 A  *  12/1980  Lytle  .................... G02B 13/18
359/715

FOREIGN PATENT DOCUMENTS

CN  101866044  10/2010
CN  102262282  11/2011
(Continued)

OTHER PUBLICATIONS

International Search Report issued for PCT/CN2014/085376, dated Jun. 3, 2015, 8 pages.

*Primary Examiner* — William Choi
(74) *Attorney, Agent, or Firm* — Hamre, Schumann, Mueller & Larson, P.C.

(57) ABSTRACT

An optical lens comprising a first lens (L1), a second lens (L2), and a third lens (L3) that are sequentially arranged on a common optical axis in the transmission direction of an incident light. Both the first lens and the second lens are positive plano-convex lenses. The third lens is a negative meniscus lens. The first lens comprises a first curved surface (S1) and a second curved surface (S2). The second lens comprises a third curved surface (S3) and a fourth curved surface (S4). The third lens comprises a fifth curved surface (S5) and a sixth curved surface (S6). The two curved surfaces of each lens respectively are the light incident surface and the light exit surface of the lens. The first to the sixth curved surfaces are sequentially arranged in the transmission direction of the incident light. The first curved surface and the third curved surface protrude in reverse to the transmission direction of the incident light. The fifth curved surface and the sixth curved surface protrude in the (Continued)

transmission direction of the incident light. The third curved surface is constituted by connecting sequentially and directly multiple arced surfaces ($\Phi 1$, $\Phi 2$, $\Phi 3$, $\Phi 4$, and $\Phi 5$) having different focuses and all of the focuses (f1, f2, f3, f4, and f5) of these arced surfaces are located on the optical axis. The optical lens is applicable in processing deep and fine holes or engraving deep and fine lines.

10 Claims, 4 Drawing Sheets

(51) Int. Cl.
    *G02B 9/12*     (2006.01)
    *G02B 3/08*     (2006.01)
    *G02B 9/34*     (2006.01)
    *B23K 26/06*     (2014.01)

(52) U.S. Cl.
    CPC ................ *G02B 3/08* (2013.01); *G02B 9/12* (2013.01); *G02B 9/34* (2013.01)

(58) Field of Classification Search
    USPC ........ 359/715, 716, 753, 771, 772, 784, 791
    See application file for complete search history.

(56) References Cited

FOREIGN PATENT DOCUMENTS

| | | |
|---|---|---|
| CN | 102262283 | 11/2011 |
| CN | 203275743 | 11/2013 |
| JP | 2002090634 | 3/2002 |
| JP | 2009086589 | 4/2009 |

* cited by examiner

OPTICAL LENS

FIELD OF THE INVENTION

The present disclosure relates to the field of optics, and more particularly relates to an optical lens applied to a laser processing.

BACKGROUND OF THE INVENTION

In modern laser processing, under some special circumstances, it is required for the laser processing to cut thin lines with a large aspect ratio, or cylindrical holes with a relatively large depth and a small aperture. For instance, in some cases, it requires to process a line with a depth of 0.5 mm and the width of only 0.05 mm. There are some other occasions where a cylindrical hole with a depth of 0.5 mm and an aperture of only 0.05 mm is required to process. Due to the aperture limit of the optical system, if the aperture is too small, sharp diffuse spots will appear during processing, and the laser energy is not enough. If the aperture is increased, then the processed thin lines or deep holes may not meet the size requirements.

SUMMARY OF THE INVENTION

Accordingly, it is necessary to provide an optical lens which can be used to process thin lines or holes.

An optical lens includes, successively coaxially arranged along a transmission direction of an incident light: a first lens being a positive plano-convex lens and having a first surface and a second surface; a second lens being a positive plano-convex lens and having a third surface and a fourth surface; and a third lens being a negative meniscus lens and having a fifth surface and a sixth surface; wherein two surfaces of each lens are a light incident surface and a light outgoing surface of the lens, respectively; the first surface to the sixth surface are successively arranged along the transmission direction of the incident light; the first surface and the third surface are convex surfaces against the transmission direction of the incident light; the fifth surface and the sixth surface are convex surfaces towards the transmission direction of the incident light; wherein the third surface is constituted by successively and directly connecting a plurality of arc surfaces having different focal points, and the focal points of the plurality of arc surfaces are on an optical axis.

In one embodiment, the third surface includes, successively coaxially along the transmission direction of the incident light: a first arc surface, a second arc surface, a third arc surface, a fourth arc surface, and a fifth arc surface, wherein the focal points of the first arc surface, the second arc surface, the third arc surface, the fourth arc surface, and the fifth arc surface are successively arranged on the optical axis along the transmission direction of the incident light.

In one embodiment, the first surface has a radius of curvature of 21 mm±5%; the first lens has a central thickness of 3 mm±5%.

In one embodiment, the third surface has a radius of curvature of 68 mm±5%; the second lens has a central thickness of 2 mm±5%.

In one embodiment, the third surface has a central thickness of 0.45 mm±5%.

In one embodiment, the fifth surface has a radius of curvature of −10 mm±5%; the sixth surface has a radius of curvature of −30 mm±5%; the third lens has a central thickness of 1 mm±5%.

In one embodiment, an interval at the optical axis between the second surface of the first lens and the third surface of the second lens is 0.2 mm±5%; an interval at the optical axis between the fourth surface of the second lens and the fifth surface of the third lens is 18 mm±5%.

In one embodiment, the optical lens further includes a fourth lens being a planar lens; wherein the first lens, the second lens, the third lens, and the fourth lens are successively coaxially arranged along the transmission direction of the incident light.

In one embodiment, the fourth lens has a central thickness of 1 mm±5%.

In one embodiment, the fourth lens has an seventh surface as a light incident surface and an eighth surface as a light outgoing surface, an interval at the optical axis between the seventh surface of the fourth lens and the sixth surface of the third lens is 1 mm±5%.

The above-mentioned optical lens can be applied to an optical system to process a deep and thin hole, or a deep and thin line. For example, the optical lens can be used to process a line with a depth of 0.5 mm and a width of 0.05 mm, or a cylindrical hole with a depth of 0.5 mm and an aperture of only 0.05 mm.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

Figure 1:
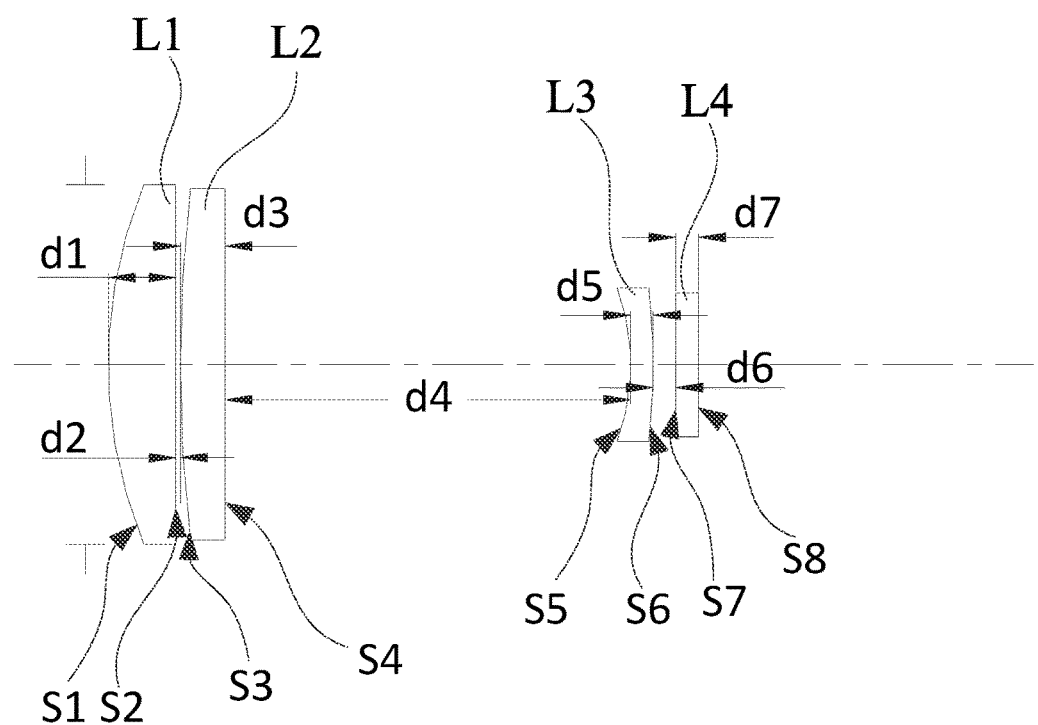
FIG. 1 is a schematic diagram of an optical lens according to one embodiment of the present invention.

Reference will now be made to the drawings to describe, in detail, embodiments of the present invention.

It should be noted that, in the present specification, the propagation direction of the light is from the left side to the right side of the drawing. The positive or negative curvature radius of the lens is determined by taking a relative positional relationship between an intersection point of the curved surface and the principal optical axis and a center of the spherical surface of the curved surface. If the center of the spherical surface is in the left of the intersection point, the radius of curvature has a negative value, if, on the other hand, the center of the spherical surface is in the right of the intersection point, the radius of curvature has a positive value. In addition, one side on the left of the lens is referred as the object side, and the other side on the right of the lens is referred as the image side. A positive lens is a lens in which the central thickness thereof is greater than the thickness of the edge, and a negative lens is a lens in which the central thickness thereof is less than the thickness of the edge.

FIG. 1 is a schematic diagram of an optical lens according to one embodiment of the present invention, and for illustrative purposes, only portions related to implementation of the disclosure are shown. The optical lens includes a first lens L1, a second lens L2, and a third lens L3, which are successively and coaxially arranged along a transmission direction of the incident light.

The first lens L1 includes a first surface S1 and a second surface S2, the second lens L2 includes a third surface S3 and a fourth surface S4, the third lens L3 has a fifth surface S5 and a sixth surface S6. Two surfaces of each lens serve as a light incident surface and a light outgoing surface, respectively. The first surface S1 to the sixth surface S6 are successively arranged along the transmission direction of the incident light.

The first lens L1 is a positive plano-convex lens. The first surface S1 of the first lens L1 is a convex surface towards the object, and the first surface S1 has a radius of curvature of 21 mm. The second surface S2 is a plane with a radius of curvature of infinite. The first lens L1 has a central thickness d1 (i.e., a thickness of the first lens L1 along the principal optical axis) of 3 mm. It should be understood that, the parameters above are expected values, and certain tolerances can be allowed to exist. The tolerance for the foregoing parameters is 5%, i.e., those parameters can vary within ±5% of the expected values.

The second lens L2 is a positive plano-convex lens. The third surface S3 of the second lens L2 is a convex surface towards the object, and the third surface S3 has a radius of curvature of 68 mm. The fourth surface S4 is a plane with a radius of curvature of infinite. The second lens L2 has a central thickness d3 of 3 mm. Similarly, the parameters above are expected values, and certain tolerances can be allowed to exist. The tolerance for the foregoing parameters is 5%, i.e., those parameters can vary within ±5% of the expected values.

Figure 2:
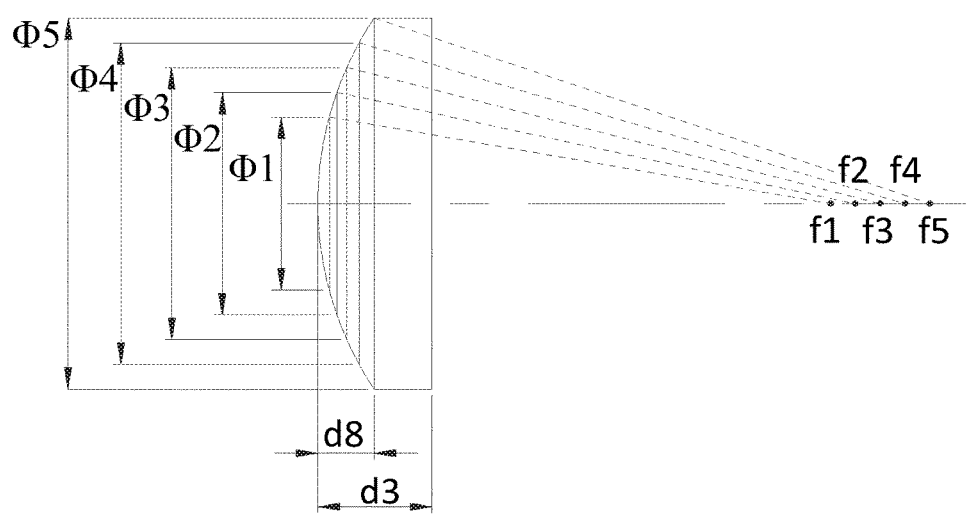
FIG. 2 is a schematic diagram of a second lens of the optical lens of FIG. 1.

Referring also to FIG. 2, the third surface S3 of the second lens L2 is constituted by a plurality of arc surfaces having different focal points, which are successively and directly connected to each other. The focal points of the plurality of arc surfaces are on an optical axis. The third surface S3 includes, successively coaxially along the transmission direction of the incident light: a first arc surface $\Phi 1$, a second arc surface $\Phi 2$, a third arc surface $\Phi 3$, a fourth arc surface $\Phi 4$, and a fifth arc surface $\Phi 5$. The focal points of the first arc surface $\Phi 1$, the second arc surface $\Phi 2$, the third arc surface $\Phi 3$, the fourth arc surface $\Phi 4$, and the fifth arc surface $\Phi 5$ are f1, f2, f3, f4, f5, respectively, which are successively arranged on the optical axis along the transmission direction of the incident light. The third surface S3 has a central thickness d8 (i.e., a thickness of the third surface S3 along the principal optical axis) of 0.45 mm. Similarly, the tolerance for the foregoing parameters is 5%, i.e., those parameters can vary within ±5% of the expected values.

The third lens L3 is a negative meniscus lens. The fifth surface S5 of the third lens L3 is a convex surface towards the image, and the fifth surface S5 has a radius of curvature of −10 mm. The sixth surface S6 of the third lens L3 is a convex surface towards the image, and the sixth surface S6 has a radius of curvature of −30 mm. The third lens L3 has a central thickness d5 of 1 mm. Similarly, the parameters above are expected values, and certain tolerances can be allowed to exist. The tolerance for the foregoing parameters is 5%, i.e., those parameters can vary within ±5% of the expected values.

Further, intervals between each lens are configured as follows. Specifically, an interval d2 at a optical axis between the light outgoing surface (the second surface S2) of the first lens L1 and the light incident surface (the third surface S3) of the second lens L2 is 0.2 mm with a tolerance of 5%, i.e., the interval d2 can vary within ±5% of the expected value. An interval d4 at the optical axis between the light outgoing surface (the fourth surface S4) of the second lens L2 and the light incident surface (the fifth surface S5) of the third lens L3 is 18 mm with a tolerance of 5%, i.e., the interval d4 can vary within ±5% of the expected value.

In one embodiment, the optical lens further includes a fourth lens L4. The first lens L1, the second lens L2, the third lens L3, and the fourth lens L4 are successively coaxially arranged along the transmission direction of the incident light.

The fourth lens L4 includes a seventh surface S7 serving as the light incident surface and an eighth surface S8 serving as the light outgoing surface. As a protective component, the fourth lens L4 is a planar lens, thus the radii of curvature of the seventh surface S7 and the eighth surface S8 are infinite. The fourth lens L4 has a central thickness d7 of 1 mm. In addition, an interval d6 at the optical axis between the seventh surface S7 (the light incident surface) of the fourth lens L4 and the sixth surface S6 (the light outgoing surface) of the third lens L3 is 1 mm. It should be understood that, the parameters above are expected values, and certain tolerances can be allowed to exist. The tolerance for the foregoing parameters is 5%, i.e., those parameters can vary within ±5% of the expected values.

The foregoing lens can be made of general optical glass. In some embodiments, in order to extend the range of application to the ultraviolet laser, fused quartz can be used.

The solution of the above embodiment will be more clearly described in the following brief descriptions:

The firth lens L1:
The first surface S1, radius of curvature of 21 mm;
The second surface S2, radius of curvature of ∞;
The central thickness, 3 mm;
The material: SILICA;
The second lens L2:
The third surface S3, radius of curvature of 68 mm;
The fourth surface S4, radius of curvature of ∞;
The central thickness, 2 mm;
The material: SILICA;
The distance between the first lens L1 and the second lens L2, 0.2 mm.
The third lens L3:
The fifth surface S5, radius of curvature of −10 mm;
The sixth surface S6, radius of curvature of −30 mm;
The central thickness, 1 mm;
The material: SILICA;
The distance between the second lens L2 and the third lens L3, 18 mm.
The fourth lens L4:
The seventh surface S7, radius of curvature of ∞;
The eighth surface S8, radius of curvature of ∞;
The central thickness, 1 mm;
The material: SILICA;
The distance between the third lens L3 and the fourth lens L4, 1 mm.

An optical system employing the foregoing optical lens can perform laser processing using laser having a working band from infrared light to ultraviolet light.

The optical effects of the optical lens are explained with reference to FIG. 3 to FIG. 5, regarding laser with a wavelength of 550 nm. The specific parameters of the optical lens are as follows: f (focal length)=60 mm; D/f (relative aperture)=1/3.5.

Figure 3:
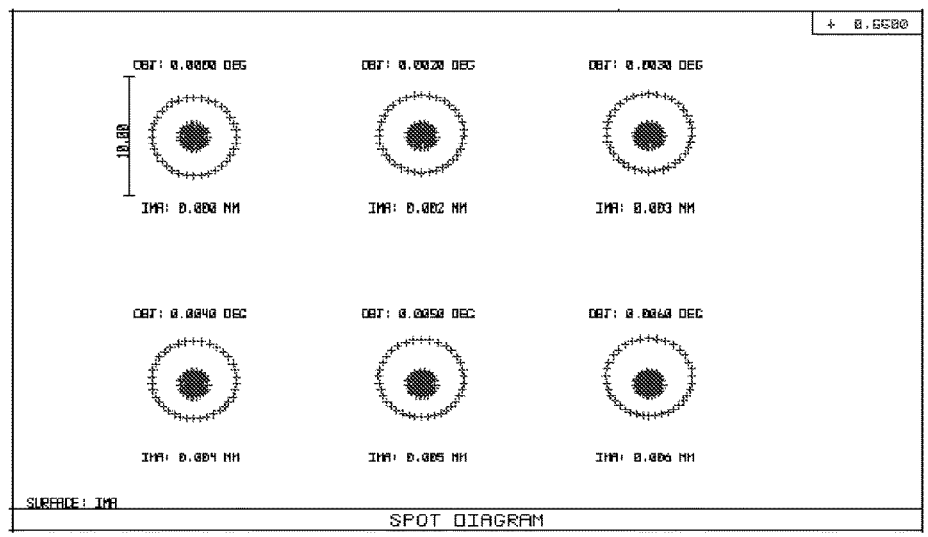
FIG. 3 is a geometrical aberration diagram of the optical lens of FIG. 1.

FIG. 3 is a geometrical aberration diagram of the optical lens. As can be seen from FIG. 3 that, the diffuse spots ΔΦ≈2 µm, indicating that the dispersion circle is very thin, the energy is focused on the focus.

Figure 4:
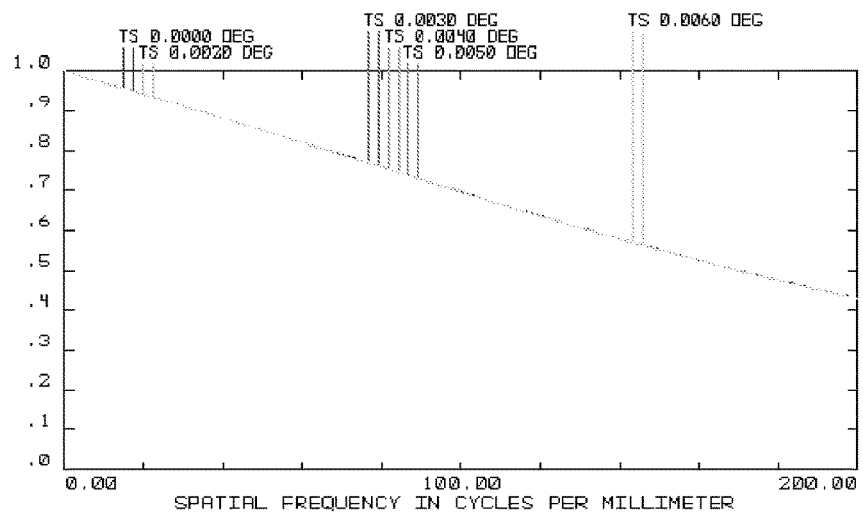
FIG. 4 is a graphic diagram showing a modulation transfer function (M.T.F) of the optical lens of FIG. 1.

FIG. 4 is a graphic diagram showing a modulation transfer function (M.T.F) of the optical lens. As can be seen from FIG. 4 that, when the resolution reaches 200 line pairs, M.T.F is 0.4.

Figure 5:
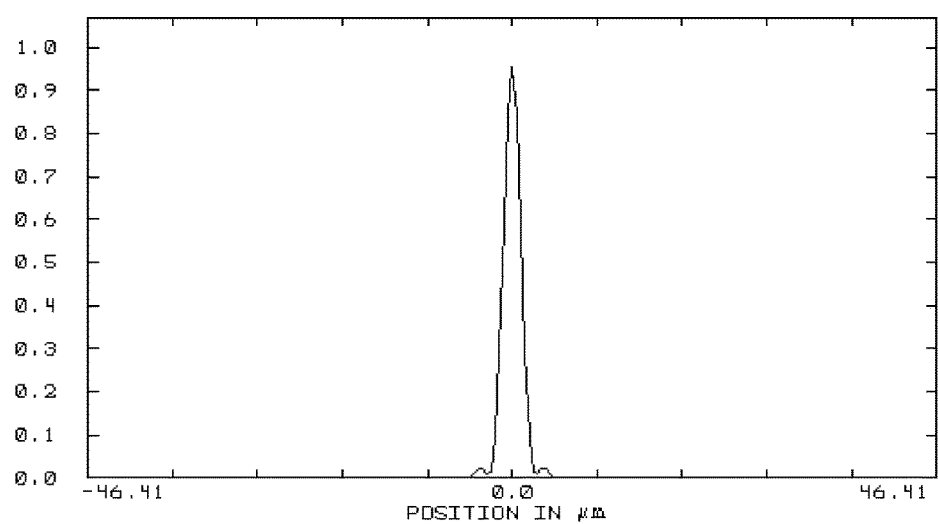
FIG. 5 is a graphic diagram showing the energy concentration curve of the optical lens of FIG. 1.

FIG. 5 is a graphic diagram showing the energy concentration curve of the optical lens, which is a result of a special correction for the system. In order to meet the requirements of drilling and marking, all the energy is concentrated within the aperture diameter ΔΦ or line width of about 2 µm, which is ideal.

Although the description is illustrated and described herein with reference to certain embodiments, the description is not intended to be limited to the details shown. Modifications may be made in the details within the scope and range equivalents of the claims.

What is claimed is:

1. An optical lens, comprising, successively coaxially arranged along a transmission direction of an incident light:
    a first lens being a positive plano-convex lens and having a first surface and a second surface;
    a second lens being a positive plano-convex lens and having a third surface and a fourth surface; and
    a third lens being a negative meniscus lens and having a fifth surface and a sixth surface;
    wherein two surfaces of each lens are a light incident surface and a light outgoing surface of the lens, respectively; the first surface to the sixth surface are successively arranged along the transmission direction of the incident light; the first surface and the third surface are convex surfaces against the transmission direction of the incident light; the fifth surface and the sixth surface are convex surfaces towards the transmission direction of the incident light;
    wherein the third surface is constituted by successively and directly connecting a plurality of arc surfaces having different focal points, and the focal points of the plurality of arc surfaces are on an optical axis.

2. The optical lens according to claim 1, wherein the third surface comprises, successively coaxially along the transmission direction of the incident light: a first arc surface, a second arc surface, a third arc surface, a fourth arc surface, and a fifth arc surface, wherein the focal points of the first arc surface, the second arc surface, the third arc surface, the fourth arc surface, and the fifth arc surface are successively arranged on the optical axis along the transmission direction of the incident light.

3. The optical lens according to claim 1, wherein the first surface has a radius of curvature of 21 mm±5%; the first lens has a central thickness of 3 mm±5%.

4. The optical lens according to claim 1, wherein the third surface has a radius of curvature of 68 mm±5%; the second lens has a central thickness of 2 mm±5%.

5. The optical lens according to claim 4, wherein the third surface has a central thickness of 0.45 mm±5%.

6. The optical lens according to claim 1, wherein the fifth surface has a radius of curvature of −10 mm±5%; the sixth surface has a radius of curvature of −30 mm±5%; the third lens has a central thickness of 1 mm±5%.

7. The optical lens according to claim 1, wherein an interval at the optical axis between the second surface of the first lens and the third surface of the second lens is 0.2 mm±5%; an interval at the optical axis between the fourth surface of the second lens and the fifth surface of the third lens is 18 mm±5%.

8. The optical lens according to claim 1, further comprising a fourth lens being a planar lens; wherein the first lens, the second lens, the third lens, and the fourth lens are successively coaxially arranged along the transmission direction of the incident light.

9. The optical lens according to claim 8, wherein the fourth lens has a central thickness of 1 mm±5%.

10. The optical lens according to claim 8, wherein the fourth lens has a seventh surface as a light incident surface and an eighth surface as a light outgoing surface, an interval at the optical axis between the seventh surface of the fourth lens and the sixth surface of the third lens is 1 mm±5%.

* * * * *